United States Patent
Bickert et al.

(10) Patent No.: US 6,765,525 B2
(45) Date of Patent: Jul. 20, 2004

(54) METHOD FOR REDUCING FALSE ALARM RATE IN RADAR IMAGES

(75) Inventors: Bernhard Bickert, Ulm-Eisingen (DE); Jochen Meyer-Hilberg, Elchingen (DE)

(73) Assignee: Eads Deutschland GmbH, Ottobrunn (DE)

( * ) Notice: Subject to any disclaimer, the term of this patent is extended or adjusted under 35 U.S.C. 154(b) by 0 days.

(21) Appl. No.: 10/370,111

(22) Filed: Feb. 21, 2003

(65) Prior Publication Data

US 2003/0210175 A1 Nov. 13, 2003

(30) Foreign Application Priority Data

Feb. 22, 2002 (DE) ......................................... 102 07 465

(51) Int. Cl.[7] .............................................. G01S 13/52
(52) U.S. Cl. .......................... 342/160; 342/93; 342/159
(58) Field of Search .......................... 342/90, 93, 104, 342/114, 155, 159, 160, 162, 195

(56) References Cited

U.S. PATENT DOCUMENTS

| | | | | |
|---|---|---|---|---|
| 5,128,684 A | * | 7/1992 | Brown ........................ | 342/189 |
| 5,499,030 A | * | 3/1996 | Wicks et al. .................. | 342/93 |
| 6,069,582 A | * | 5/2000 | Nelander ...................... | 342/169 |
| 6,304,515 B1 | * | 10/2001 | Spiesberger .................. | 367/124 |
| 6,400,306 B1 | * | 6/2002 | Nohara et al. ................ | 342/25 |
| 6,518,914 B1 | * | 2/2003 | Peterson et al. .............. | 342/25 |

FOREIGN PATENT DOCUMENTS

| | | | | |
|---|---|---|---|---|
| DE | 10012411 A1 | * | 9/2001 | ........... G01S/7/292 |
| DE | 10035530 A1 | * | 2/2002 | ............. G01S/7/28 |

* cited by examiner

Primary Examiner—Thomas H. Tarcza
Assistant Examiner—Isam Alsomiri
(74) Attorney, Agent, or Firm—Crowell & Moring LLP (57) ABSTRACT

A method for reducing the false alarm rate, i.e. the number of alarms of fixed targets erroneously declared as moving targets in the radar images of two- or multi-channel MTI radar devices, wherein the suppression of fixed target echoes over the moving target echoes within the main antenna lobe occurs through a space time adaptive processing—STAP—filter. The method uses a comparison of the amplitude amounts or power values of the range Doppler frequency cells with a threshold that can be specified in constant terms and summary of the resulting alarms. A target function is compared with defined test functions and selection criteria are determined from suitable combined calculation methods that are applied to the test and target functions for the purpose of classifying a respective target alarm as a moving or fixed target alarm.

10 Claims, 11 Drawing Sheets

METHOD FOR REDUCING FALSE ALARM RATE IN RADAR IMAGES

The invention relates to a method for reducing the false alarm rate on moving targets in radar images of two or multi-channel MTI radar devices of the type using space time adaptive processing.

BACKGROUND AND SUMMARY OF THE INVENTION

This application claims the priority of 102 07465.8, filed Feb. 22, 2002, the disclosure of which is expressly incorporated by reference herein.

Raw radar data consists of a mixture of signals, e.g. echoes of stationary and moving objects and interferences, e.g. broadband and narrowband noise. When evaluating the radar data generally the interferences are supposed to be suppressed so that the signals of interest can be detected well.

For the extraction of moving objects it is standard practice to employ so-called MTI (moving target indication) signal processing. Apart from identification and recognition through range Doppler frequency analysis, parameter estimation such as for distance, angle of view and velocity of moving targets is part of this signal processing method. With this method the echo of the moving target is essentially disrupted by the receiver noise.

In the case of air-ground radar devices or ground-air radar operating modes, which are characterized by a relatively clear spectral broadening of the direction of maximum radiation of the antenna (main antenna lobe), additionally echoes of stationary objects occur, which are erroneously interpreted as moving targets. These false target alarms occur mainly in the range Doppler frequency range of the direction of maximum radiation of the antenna (main antenna lobe) and with low main/side lobe distance of the antenna also in the antenna side lobe range.

Figure 1:
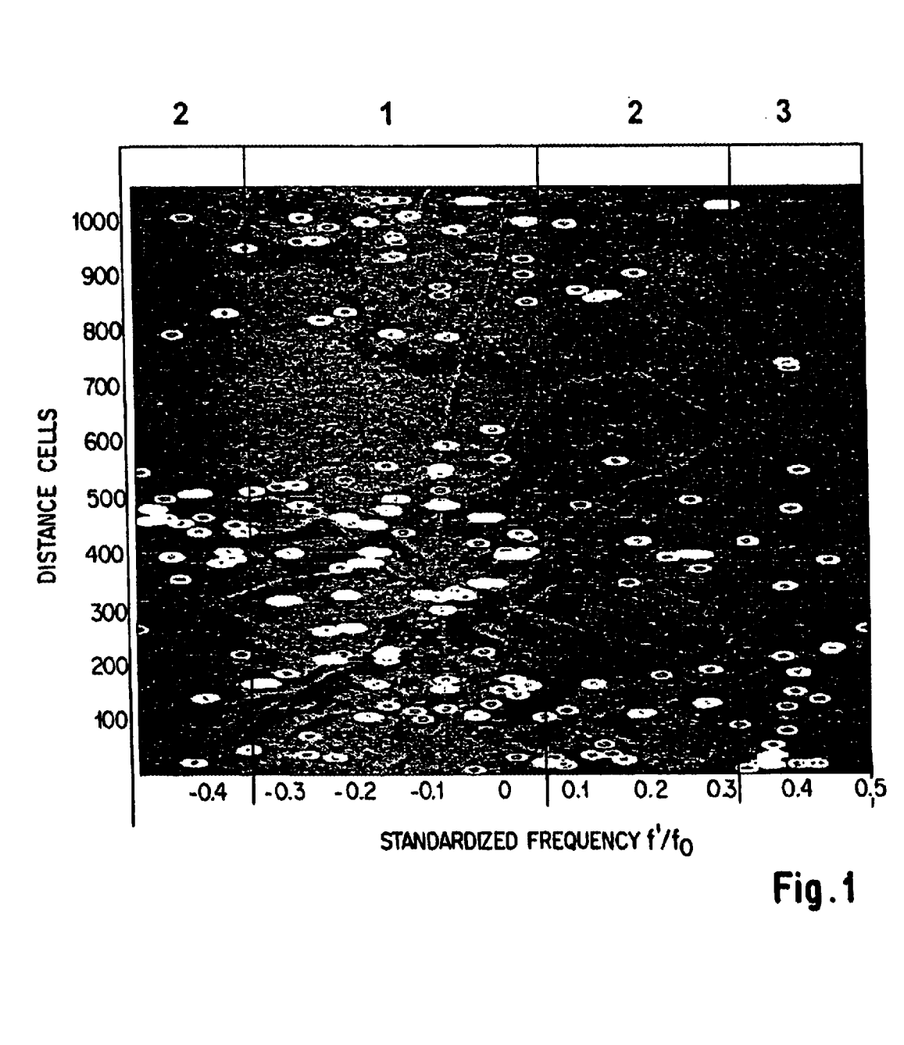
FIG. 1 shows typical range Doppler frequency image with detected fixed and moving target echoes.

FIG. 1 shows an MTI radar image with detected fixed and moving targets, which are clearly visibly dispersed across the entire radar image. They are detections in the main antenna lobe area 1, in the side lobe area 2 and in the antenna lobe free area 3. In the case of a large number of detections, echoes of fixed targets are involved, which lead to false alarms that have to be recognized and eliminated.

For suppressing echoes of fixed targets generally the so-called STAP (space time adaptive processing) method is applied, which we know e.g. from German Reference DE 100 12 411 A1 or DE 100 35 530 A1. The STAP method takes advantage of the deterministic amplitude and phase correlations between adjacent antenna channels of a coherent pulse Doppler radar device. These correlations are adaptively estimated from the raw radar data. The STAP method however is generally only applied in the main antenna lobe area.

In conventional MTI signal processing, the detection of moving targets occurs within the antenna lobe free region through CFAR (constant false alarm rate) algorithms. With CFAR the amplitude amount or the power value of a potential target is compared to the average amplitude amount or the average power value of its environment. When the amplitude amount or the power ratio exceeds a specified threshold value, target alarms are issued. Due to the Doppler processing step they are allocated to moving targets. The method is normally not applied in the main antenna or side antenna lobe areas. The non-homogeneity of the environment results in an extreme number of detections, which would largely have to be attributed to non-moving targets.

It is the object of the invention to provide a method, which enables a considerable reduction in the false alarm rate in radar, images compared to the state of the art.

The present invention involves:

providing an STAP filter with visible side antenna lobe in the radar image for the suppression of fixed targets in the side antenna lobe, comparing the amplitude amount or power value of each range Doppler frequency cell with a threshold that can be specified in constant terms across all range Doppler frequency cells and summary of the resulting alarms, wherein only those alarms are clustered whose amplitude amounts or power values are above the specified threshold, wherein first a summary of alarms that is directed in the direction of the Doppler frequency into Doppler frequency clusters occurs based on their minimal distance to each other and subsequently a summary of Doppler frequency clusters that is directed in the distance direction into range Doppler frequency clusters occurs based on their minimal distance to each other, comparing of a target function with a test function, wherein the test function is an intersecting function of a two-dimensional characteristic function of the amplitude and phase progressions of the main antenna lobe as a function of the Doppler frequency and the target function is a characteristic function, calculated for each alarm, of the amplitude and phase progressions of the respective target as a function of the Doppler frequency on the Doppler frequency position of the respective target, and determining selection criteria from suitable combined calculation methods that are applied to the test and target functions for the purpose of identifying a respective target alarm as a moving target or fixed target.

One benefit of the method pursuant to the present invention is a reduction in false claim rate when utilizing the multi-channel feature of the coherent radar system, i.e. the decision to declare a fixed target or a disturbance as a moving target, is reduced considerably. Additionally, the present method achieves an improved reduction in the false alarm rate even with a poor main lobe/side lobe distance of the antenna because the method pursuant to the invention permits the adaptive estimation of the side antenna lobe progression.

Other objects, advantages and novel features of the present invention will become apparent from the following detailed description of the invention when considered in conjunction with the accompanying drawings.

BRIEF DESCRIPTION OF THE DRAWINGS

The invention with its individual procedures steps as well as further beneficial embodiments of the invention are explained in more detail in the following based on the figures.

DETAILED DESCRIPTION OF THE PREFERRED EMBODIMENT

After the STAP filtration process, i.e. the first step of the method pursuant to the invention, the fixed targets are largely suppressed. Fixed targets with large amplitudes however are still visible in the MTI radar image and continue to cause false alarms. Pursuant to the invention, in a second step, in the radar images that have been filtered in the STAP the amounts or power values of the individual range Doppler frequency cells are compared to a threshold value that is constant across all range Doppler frequency cells. The threshold value can beneficially be deduced from the mean value and the variance across all cells. This results in the advantage that computation time over the CFAR method is reduced considerably.

Figure 2:
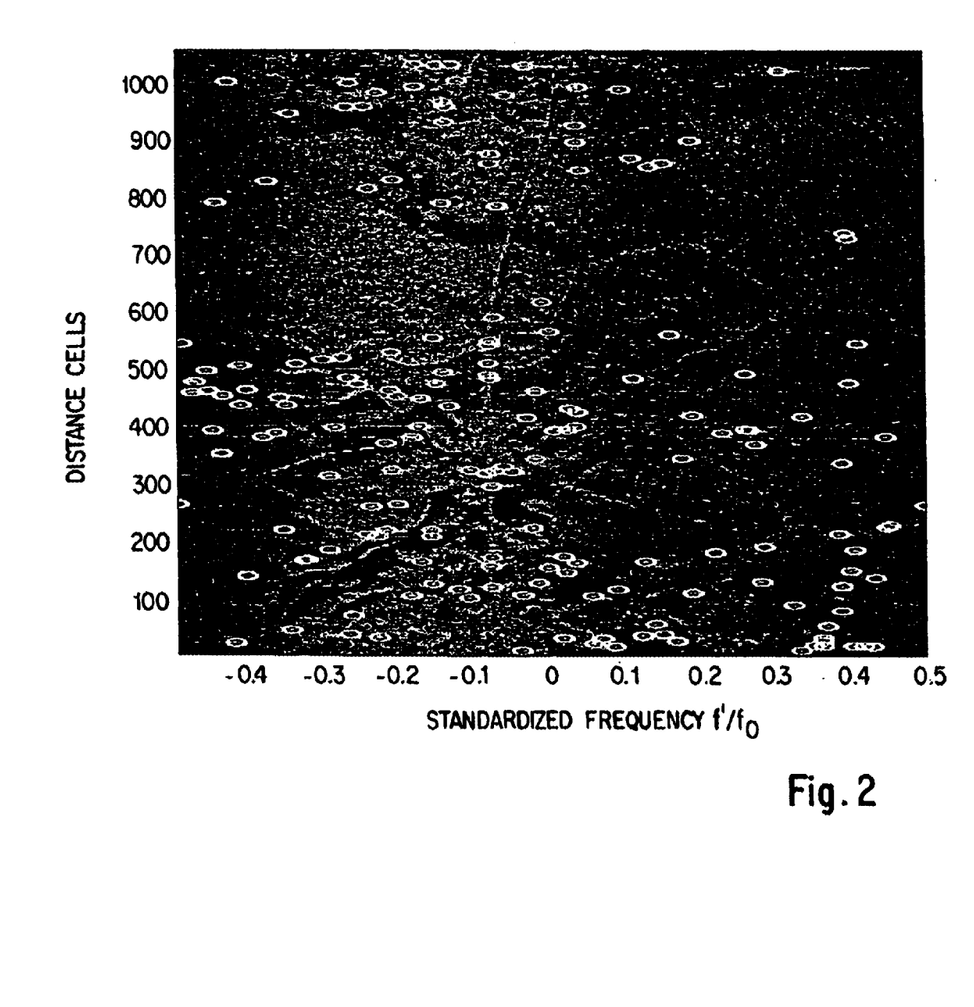
FIG. 2 shows range Doppler frequency image of FIG. 1 after the clustering process.

The alarms gained from this threshold comparison are summarized into clusters. Clustering hereby occurs initially in the Doppler frequency direction. Alarms that have minimal distance to each other in the Doppler frequency direction are summarized into so-called Doppler frequency clusters. After that, clustering in the distance direction occurs into so-called range Doppler frequency clusters. Equivalent to the already described Doppler frequency clustering process, the Doppler frequency clusters are summarized into range Doppler frequency clusters in the distance direction in accordance with their minimal distance. The advantage of this two-stage clustering process is that it results in a considerable reduction in the computation time over a single-stage clustering process. The advantage of this clustering method is that both the variance of the parameters that are to be calculated in the following and the number of alarms that are to be processed are reduced drastically. FIG. 2 shows the range Doppler frequency image from FIG. 1 after the clustering process has been performed. It clearly shows that multiple accumulations of detections were reduced significantly.

In the third procedural step pursuant to the invention, the alarms remaining from the previous two procedural steps are classified as moving or fixed target alarms based on their amplitude and phase progressions across the frequency. This stop provides that the amplitude and phase progressions of the main antenna lobe are estimated adaptively and the amplitude and phase information of the alleged targets (alarms) are suitably compared to the adaptively estimated progression.

The aforementioned first step uses the STAP filter function known e.g. from German Reference DE 100 355 30 A1

$$X_{STAP}(f)=H_1(f) \cdot X_1(f) - H_2(f) \cdot X_2(f)$$

wherein

| | |
|---|---|
| $X_1(f), X_2(f)$: | Doppler frequency value channel 1, 2 of the MTI radar device on the frequency position f, |
| $H_1(f), H_1(f)$: | STAP filter coefficient channel 1, 2 of the MTI radar device on the frequency position f, |
| $X_{STAP}(f)$: | STAP filtered Doppler frequency value |
| $f \in [f_{min}, \ldots f_{max}]$: | frequency f from the frequency range $f_{min}$ to $f_{max}$ |

The Doppler frequency values $X_1(f), X_2(f)$ are replaced with the STAP filter values $H_2(f), H_1(f)$. This results in an adaptive two-dimensional characteristic function of the amplitude and phase progressions as a function of the Doppler frequencies f and f' within the main antenna lobe in the form of $$X_{char}(f, f')=H_1(f) \cdot H_2(f') - H_2(f) \cdot H_1(f').$$

Figure 3:
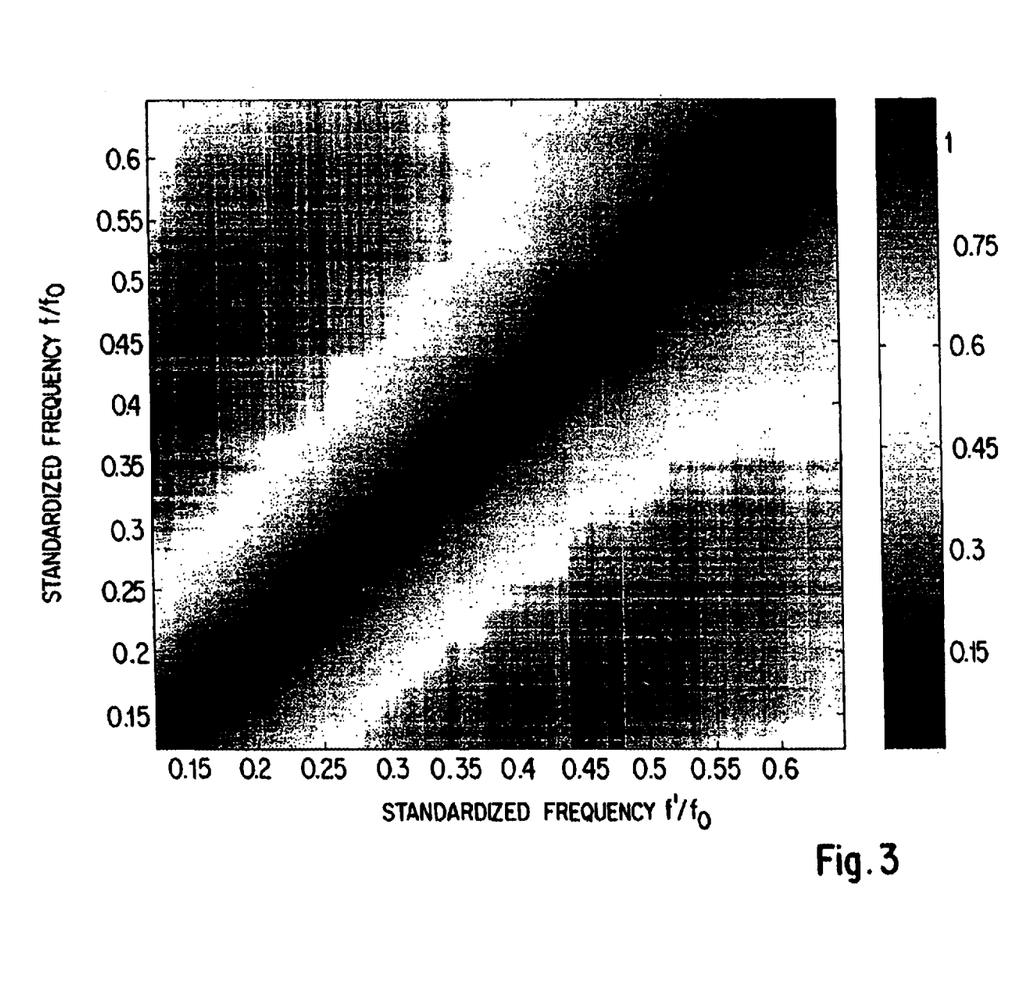
FIG. 3 is an example of a progression of the amount of the characteristic function $X_{char}(f, f')$.

FIG. 3 depicts the progression example of the amount of the characteristic function $X_{char}(f, f')$. In the place of f'≅f is $H_1(f) \cdot H_2(f'=f) \cong H_2(f) \cdot H_1(f'=f)$, therefore $X_{char}(f, f'=f) \cong 0$. The resulting progression of small values along a diagonal is characteristic for this function. On the amplitude progression the spectral progression of the main antenna lobes can be read, on the phase progression the spatial correlation of both antenna channels can be read.

For further computations, the steps $X_{Test}(f)$ from the function $X_{char}(f, f')$ are used:

$$X_{Test}(f)|_{f\,min}=H_1(f) \cdot H_2(f_{min}) - H_2(f) \cdot H_1(f_{min})$$

$$X_{Test}(f)|_{f\,min+1}=H_1(f) \cdot H_2(f_{min+1}) - H_2(f) \cdot H_1(f_{min\,+1})$$

$$X_{Test}(f)|_{f\,max}=H_1(f) \cdot H_2(f_{max}) - H_2(f) \cdot H_1(f_{max}).$$

Each of these intersecting functions is also called "test function" in the following.

In the second step the familiar STAP filter function $X_{STAP}(f)$, the Doppler frequency values $X_1(f), X_2(f)$ are replaced by the current spectral values $A_1(f_z), A_2(f_z)$ on the target Doppler position $f_z$. The resulting function is then one that is described as "target function" in the following, pursuant to $$X_{Ziel}(f)=H_1(f) \cdot A_2(f_z) - H_2(f) \cdot A_1(f_z)$$

with $f_z$: Doppler frequency position of the target alarm.

Figure 4:
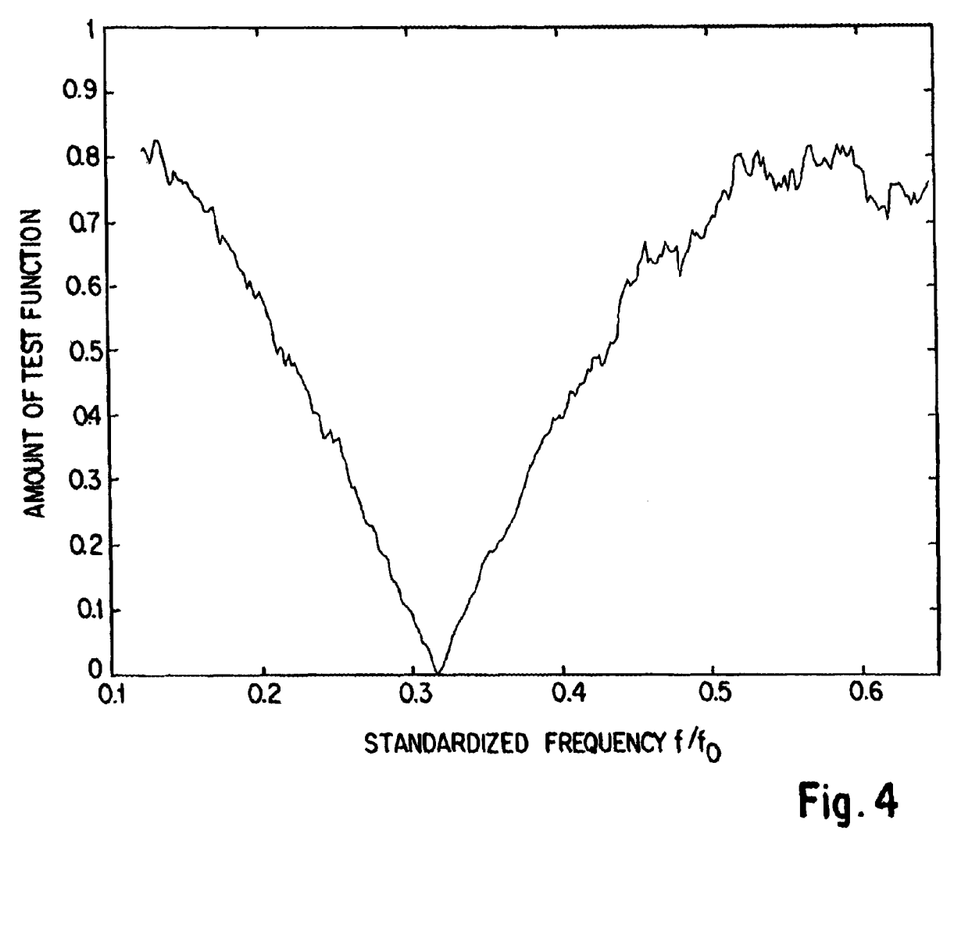
FIG. 4 illustrates an example of a progression of a test function as a section from the characteristic function $X_{char}(f, f')$.
Figure 5:
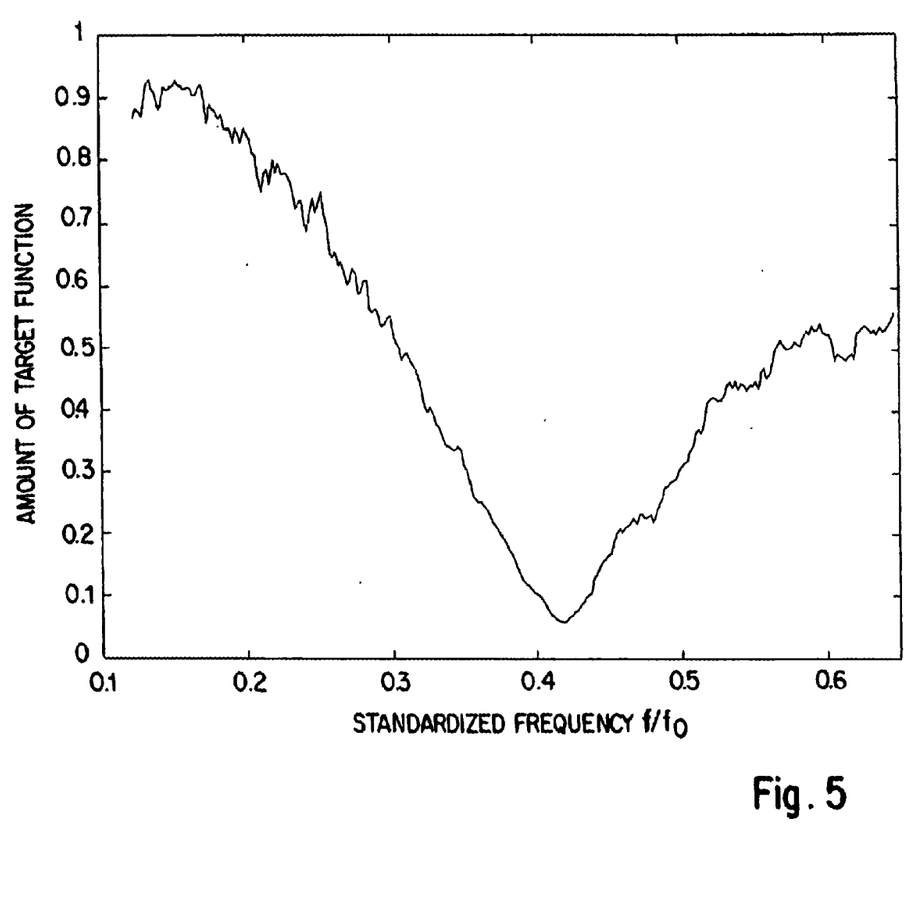
FIG. 5 shows a progression of a target function for a target alarm on the Doppler frequency position $f_z$.

The progressions of test function example $X_{Test}(f)$ and a target function example $X_{Ziel}(f)$ are depicted in FIG. 4 and FIG. 5. The progression of the target function is similar to the spectrally shifted progression of the test function.

Two different comparisons of the target function $X_{Ziel}(f)$ with the test functions $X_{Test}(f)|_{f'}$ wherein mainly the similarity in the course of the two functions is considered, make it possible to separate the alarms of the moving targets from the alarms of the fixed targets or those of signal noise. Pursuant to the invention, a suitable combined computation and evaluation method is applied to the target and test functions.

In a first step of the combined method pursuant to the invention, beneficially the cross correlation Y(f') of the target function is computed with the intersecting areas (test functions) from the characteristic function $X_{char}(f, f')$:

$$Y(f') = \sum_{f=f_{min}}^{f=f_{max}} X_{Ziel}(f) \cdot X_{char}(f, f')$$

In a second step of the combined method pursuant to the invention, beneficially pursuant to the least-mean-square (LMS) approach the least error squares s(f') between the target and the test functions are computed:

$$s(f') = \sum_{f=f_{min}}^{f=f_{max}} (X_{Ziel}(f) - X_{char}(f, f'))^2$$

They are standardized for the number N of the Doppler cells in the frequency range $f_{min}$ to $f_{max}$, the square root is computed and the corresponding value is logarithmized, resulting in the final function S(f):

$$S(f') = 20 \cdot \log_{10}\left(\sqrt{\frac{s(f')}{N}}\right)$$

The two computation stages are conducted, in particular, in parallel. Provided that certain homogeneity of the characteristic function exits, the number of test functions can be limited.

Figure 6A:
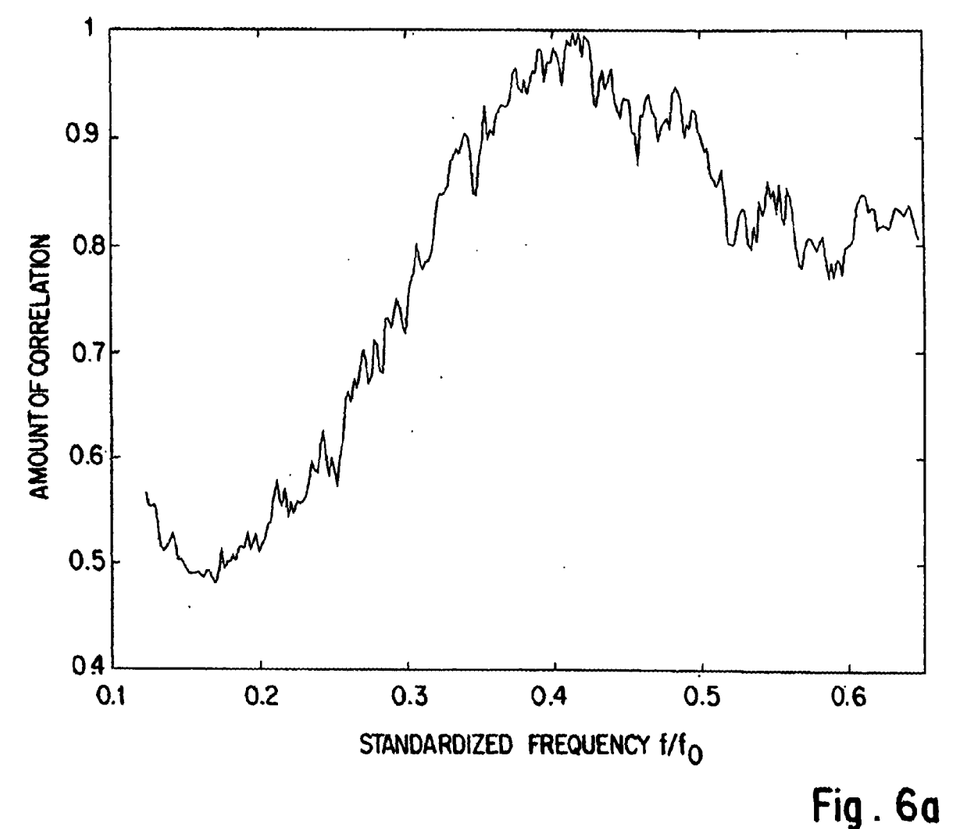
FIG. 6a shows a progression of the results from the correlation of the target function with sections from the characteristic function $X_{char}(f, f')$.
Figure 6B:
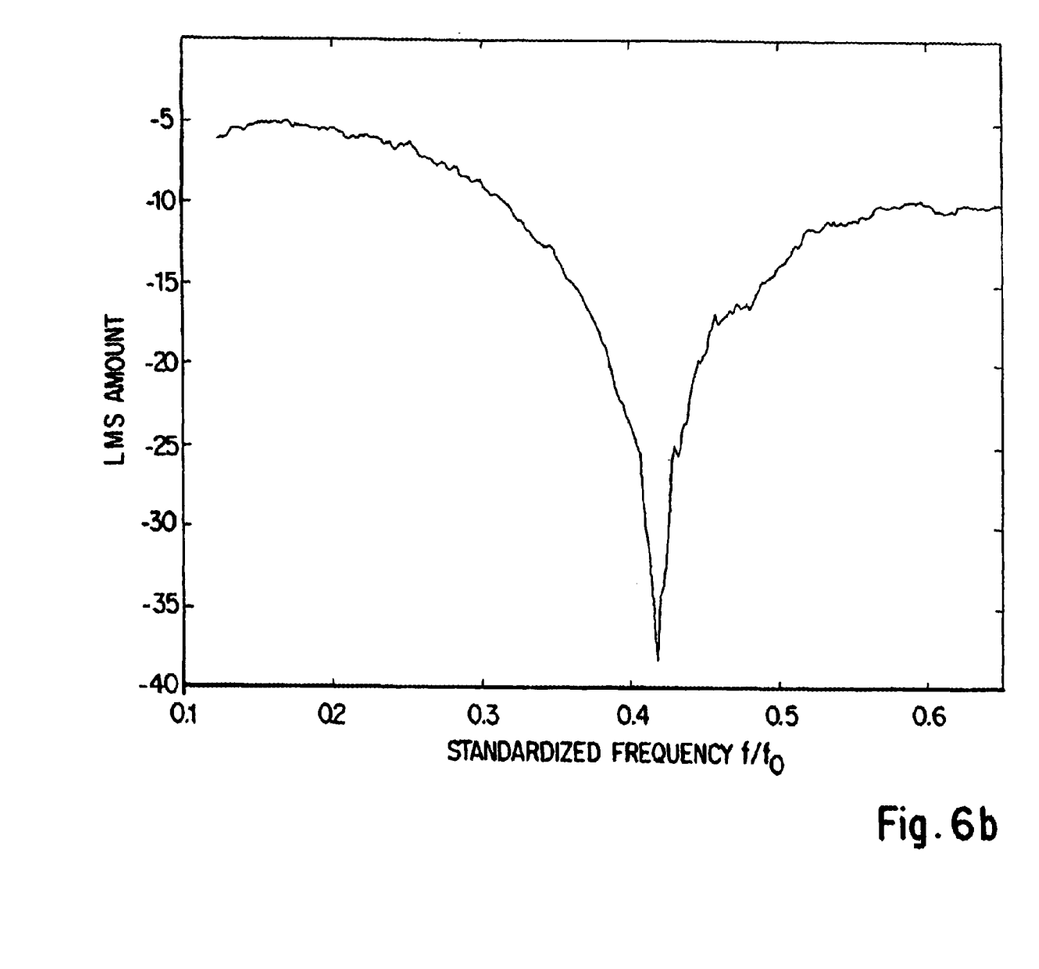
FIG. 6b shows a progression of the results from the LMS approach between the target and the test functions.

FIGS. 6a and 6b show the results of the combined method. FIG. 6a depicts the course of the amount of the cross correlation Y(f) between the target function from FIG. 5 and the intersecting areas from the characteristic function $X_{char}(f, f')$ from FIG. 3.

Accordingly FIG. 6b shows the progression of the square minimum S(f') between the target function from FIG. 5 and the intersecting areas from the characteristic function $X_{char}(f, f')$ from FIG. 3.

Pursuant to the invention, the combined computations offer selection criteria with which target alarms can be classified as fixed or moving target alarms. In a beneficial embodiment of the method pursuant to the invention, the following selection criteria are being used:

1. the target speed estimated from the deviation between the detected Doppler frequency position $f_z$ and the absolute position of the minimum of the LMS approach for the respective target,
2. the amplitude of the maximum of the correlation function,
3. the amplitude of the minimum of the LMS approach,
4. the distance of the positions of the maximum of the correlation functions and those of the minimum of the LMS approach.

Pursuant to the first selection criteria, an alarm is then declared as a moving target when its computed speed exceeds a specified speed threshold value. Accordingly an alarm is declared a fixed target when its speed is below the threshold value.

Figure 7A:
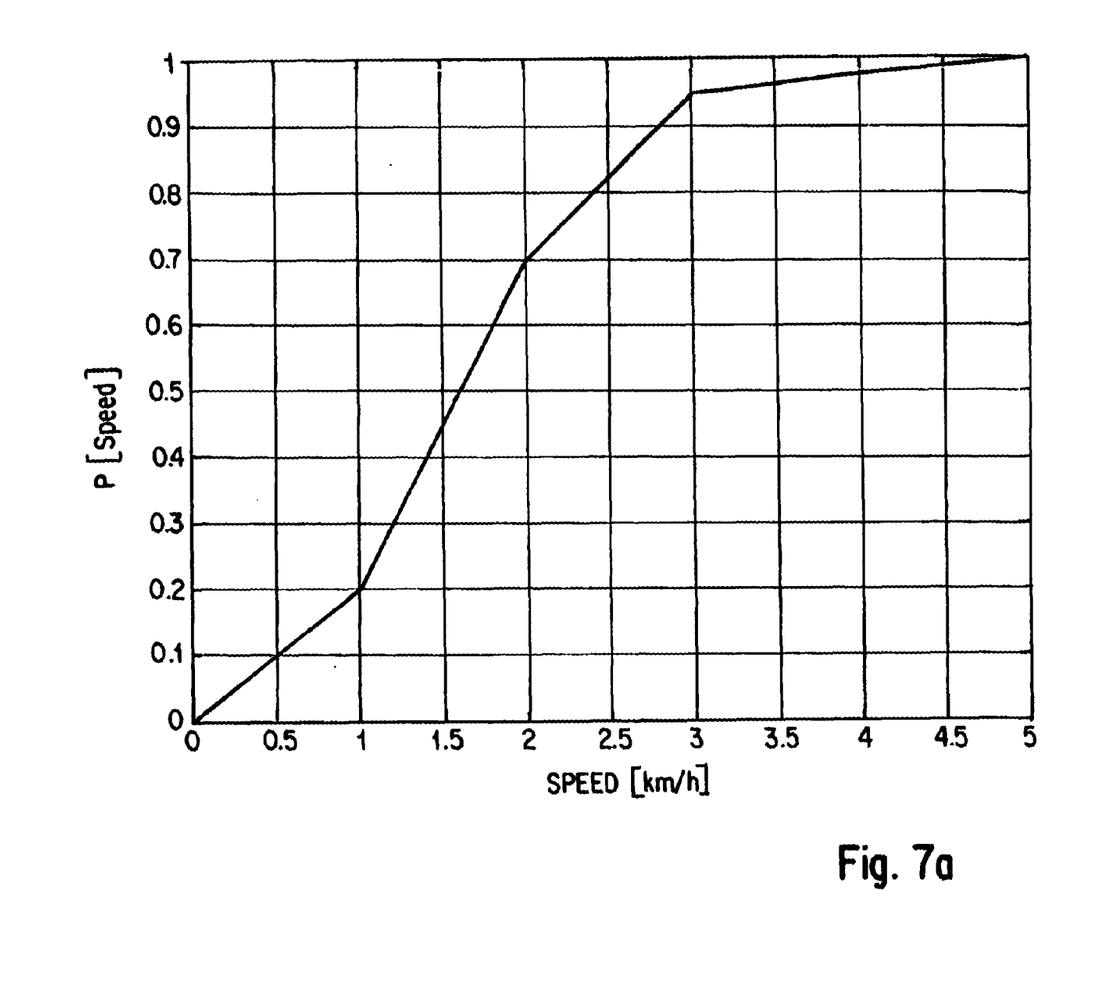
FIG. 7 illustrates the examples of progressions of the probabilities of the selection criteria.
Figure 7B:
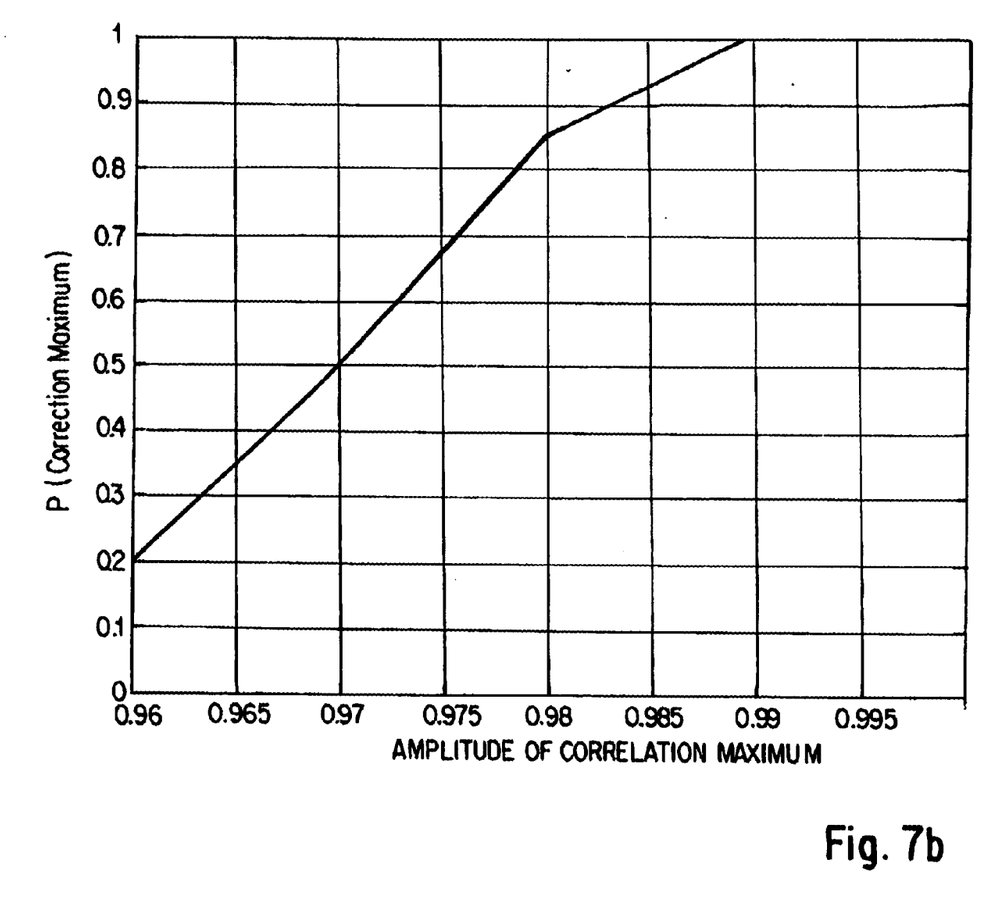
Figure 7C:
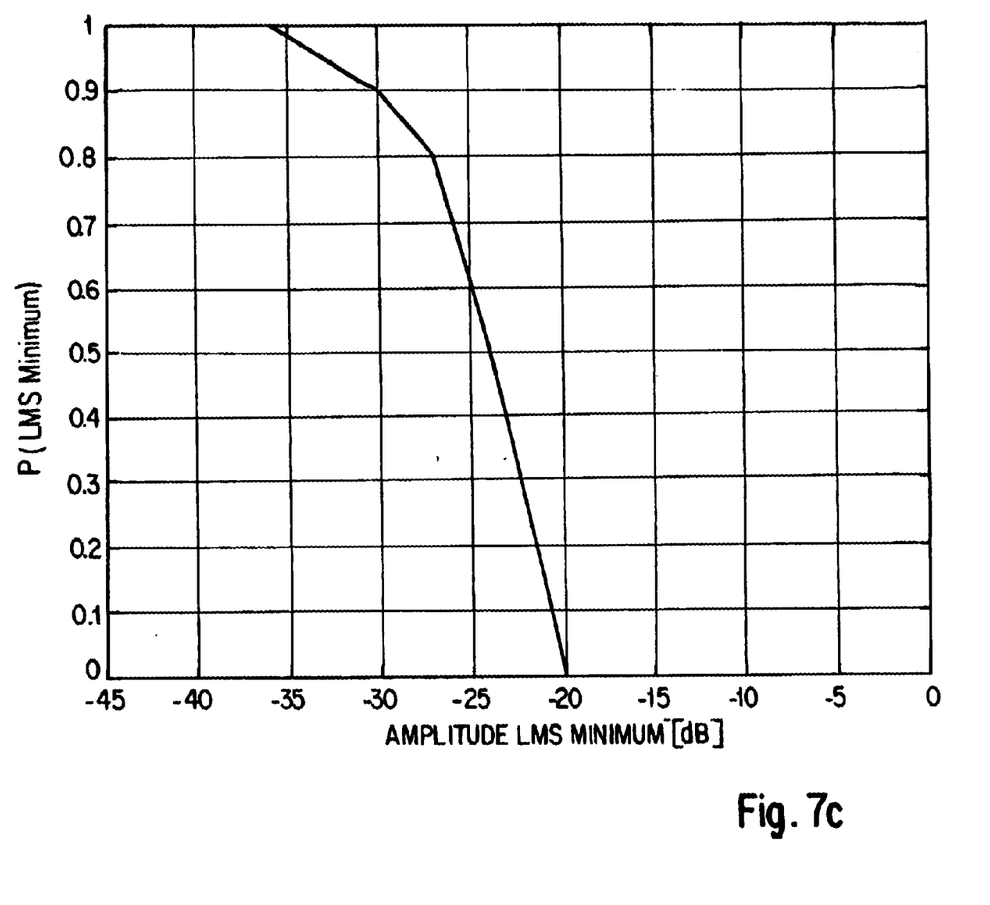

In a preferred embodiment the "speed" selection criterion is weighted with a probability value $P(v_{Ziel})$. An alarm in this case is classified with a certain probability as fixed or moving target alarm. This probability value can be based on empirical experiences. FIG. 7a shows the course of the probability distribution for the "speed" selection criterion and FIG. 7b depicts the probability progression for a moving target as a function of the amount of the correlation maximum. Accordingly FIG. 7c shows the course of probability for a moving target as a function of the logarithmized amplitude of the minimum of the LMS approach.

Figure 7D:
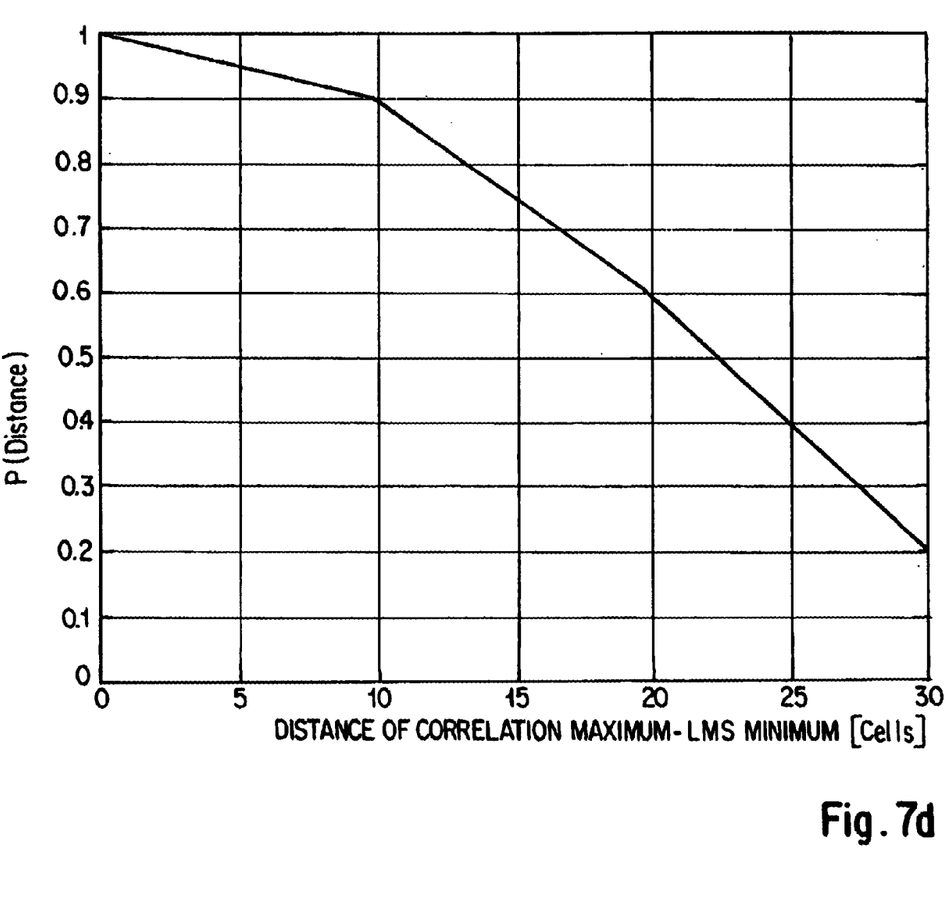

Those target alarms that are caused by receiver noise can be suppressed with the fourth selection criterion. Hereby the distance between the position of the maximum of the amount of the correlation function and the position of the minimum of the logarithmized amplitude of the LMS approach is weighted with a probability value. FIG. 7d shows the probability course of the fourth selection criterion.

Beneficially the four individual probabilities $P_i$ of the individual selection criteria lead to an overall probability $P_{Gesamt}$ pursuant to $$P_{Gesamt} = \prod_{i=1}^{4} P_i.$$

The overall probability $P_{Gesamt}$ is beneficially compared to a specified threshold value $P_{Schwelle}$ pursuant to $P_{Gesamt} \geq P_{Schwelle}.$ Alarms with an overall probability $P_{Gesamt}$ higher or equal to the threshold value $P_{Schwelle}$ are thus by definition classified as moving target alarms. Alarms with an overall probability lower than the threshold value are by definition classified as fixed target alarms.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for reducing the false alarm rate produced by the number of alarms of fixed targets erroneously declared as moving targets in the radar images of two- or multi-channel MTI radar devices, comprising the steps of:
   providing and using a space time adaptive processing filter in a visible side antenna lobe in the radar image for the suppression not fixed targets in the side antenna lobe,
   comparing amplitude amounts or power values of range Doppler frequency cells with a threshold specified in constant terms and summing of resulting alarms from said comparison, wherein only those alarms whose amplitude amounts or power values are above the specified threshold are used and combined into clusters, wherein first a summary of alarms that is directed in a direction of the Doppler frequency into Doppler frequency clusters occurs based on their minimal distance to each other and subsequently a summary of Doppler frequency clusters that is directed in a distance direction into range Doppler frequency clusters occurs based on their minimal distance to each other,
   comparing a target function with a test function, wherein the test function is an intersecting function of a two-dimensional characteristic function of the amplitude and phase progressions of a main antenna lobe as a function of the Doppler frequency and the target function is a characteristic function, calculated for each alarm, of the amplitude and phase progressions of a respective target as a function of the Doppler frequency on the Doppler frequency position of the respective target, and
   determining selection criteria from suitable combined calculation methods that are applied to the test and target functions for the purpose of classifying a respective target alarm as a moving or fixed target alarm.

2. The method according to claim 1, wherein the constant specified threshold is determined from the mean value and the variance of the amplitudes or power values of all range Doppler frequency cells.

3. The method according to claim 1, wherein the two-dimensional characteristic function of the amplitude and phase progressions of the main antenna lobe is calculated pursuant to $$X_{char}(f,f')=H_1(f)\cdot H_2(f')-H_2(f)\cdot H_1(f')$$

with $H_1(f)$, $H_2(f)$: STAP filter coefficient f, f'∈[$f_{min}$, ..., $f_{max}$]: Doppler frequency.

4. The method according to claim 1, wherein for each target alarm, the characteristic function of the amplitude and phase progressions of the respective target are calculated pursuant to $$X_{Ziel}(f)=H_1(f)\cdot A_2(f_2)-H_2(f)\cdot A_1(f_2)$$

with $A_1$, $A_2$: complex amplitudes of the target alarm f: Doppler frequency $f_2$: Doppler frequency position of the target alarm.

5. The method according to claim 3, wherein the test function is a one-dimensional function pursuant to an intersection with f'= constant from the two-dimensional characteristic function $X_{char}(f, f')$.

6. The method according to claim 1, further comprising the steps of;

completing in a parallel step, a correlation of the target function with the test functions; and pursuant to the least mean square—LMS—, approaching the least error square between the target and the test functions.

7. The method according to claim 6, comprising the further step of;

from the correlation function and the result of the computation pursuant to the LMS approach, extracting the following four selection criteria for the classification of a target as a moving target or fixed target:
1. the target speed estimated from the distance between the detected Doppler frequency position $f_2$ and the absolute position of the minimum of the LMS approach for the respective target,
2. the amplitude of the maximum of the correlation function,
3. the amplitude of the minimum of the LMS approach,
4. the distance of the position of the maximum of the amount of the correlation function and the position of the minimum of the logarithmized amplitude of the LMS approach.

8. The method according to claim 7, wherein each selection criterion is weighted with a specified probability value $P_i$, with which the identified target is a moving target.

9. The method according to claim 8, wherein the overall probability value $P_{Gesamt}$ resulting from the individual specified probability values $P_i$ is compared to a threshold value.

10. A method for reducing a false alarm rate in a system for detecting moving targets from radar images, comprising the steps of:

analyzing a visible side antenna lobe in a radar image by a time adaptive processing filter in order to suppress fixed targets in the side antenna lobe;

comparing values of range Doppler frequency cell with a specified threshold value;

providing an indication of alarms resulting from said step of comparing and summing said indicated alarms;

providing a summary of alarms directed in a direction of the Doppler frequency and providing Doppler frequency clusters based on their minimal distance to each other;

providing a summary of Doppler frequency clusters directed in a distance direction based on their minimal distance to each other;

comparing a target function with a test function, wherein said test function is an intersecting function of a 2-dimensional characteristic function of amplitude and phase progressions of a main antenna lobe as a function of the Doppler frequency and wherein the target function is a characteristic function, calculated for each alarm, of the amplitude and phase progressions of a respective target as a function of the Doppler frequency on the Doppler frequency position of the respective target; and determining selection criteria from a suitable combined calculation method applied to the test and target functions in order to classify respective target alarms as a moving or fixed target alarm.

* * * * *